United States Patent [19]

Cyr

[11] Patent Number: 5,089,136
[45] Date of Patent: Feb. 18, 1992

[54] APPARATUS FOR THE DECANTATION TREATMENT OF LIQUID CONTAINING THEREIN SUSPENDED MATERIAL

[75] Inventor: Robert Cyr, Montréal, Canada

[73] Assignee: Degremont Infilco, Ltd., Canada

[21] Appl. No.: 586,475

[22] Filed: Sep. 21, 1990

[30] Foreign Application Priority Data

Sep. 29, 1989 [CA] Canada .................. 614704

[51] Int. Cl.$^5$ ............................................. B01D 21/02
[52] U.S. Cl. .................................... 210/519; 210/521
[58] Field of Search ............... 210/512, 521, 522, 533, 210/532.1, 802

[56] References Cited

U.S. PATENT DOCUMENTS

| | | | |
|---|---|---|---|
| 3,494,475 | 2/1970 | Hedström et al. | 210/521 |
| 3,615,025 | 10/1971 | Rice | 210/521 |
| 3,687,298 | 8/1972 | Rozkydalek | 210/522 |
| 3,788,981 | 1/1974 | Richard et al. | 210/521 |
| 4,156,644 | 5/1979 | Richard et al. | 210/521 |
| 4,816,157 | 3/1989 | Jenelle | 210/521 |

FOREIGN PATENT DOCUMENTS

| | | |
|---|---|---|
| 994118 | 11/1951 | France . |
| 2079286 | 11/1971 | France . |
| 89701 | 5/1896 | Germany . |
| 2731271 | 1/1978 | Germany . |
| 495764 | 9/1970 | Switzerland . |
| 991096 | 6/1976 | Canada . |
| 1024082 | 1/1978 | Canada . |
| 1115038 | 12/1955 | France . |
| 2132954 | 11/1972 | France . |
| 2196832 | 3/1974 | France . |

OTHER REFERENCES

Translation of Swiss Patent 495764.

Primary Examiner—Stanley S. Silverman
Assistant Examiner—Christopher Upton
Attorney, Agent, or Firm—Eckert Seamans Cherin & Mellott

[57] ABSTRACT

The invention relates to an improvement with apparatus for the decantation treatment of liquid containing therein suspended material and comprising a sludge bed contained within a first network of plates or tubes. This improvement is characterized by the fact that a second network of parallel plates inclined to the horizontal at an angle from 40 degrees to 80 degrees (especially 60 degrees) is positioned within the sedimentation zone, the distance between adjoining plates of said second network being much smaller than the one between adjoining plates of the first network.

10 Claims, 6 Drawing Sheets

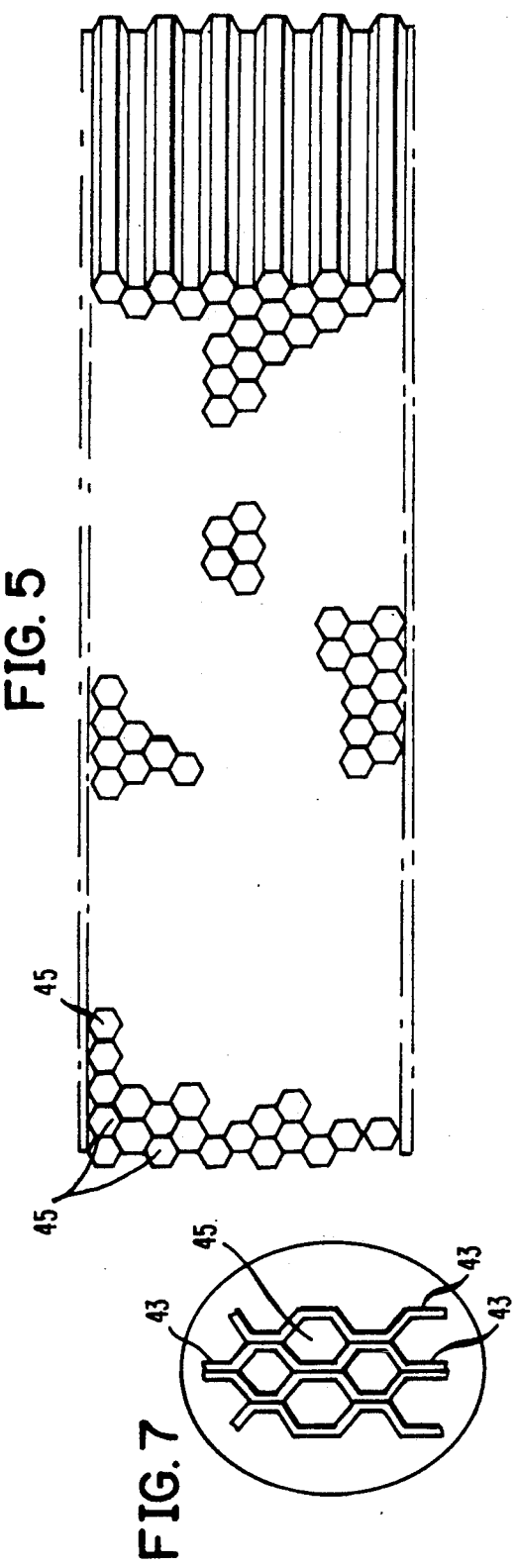
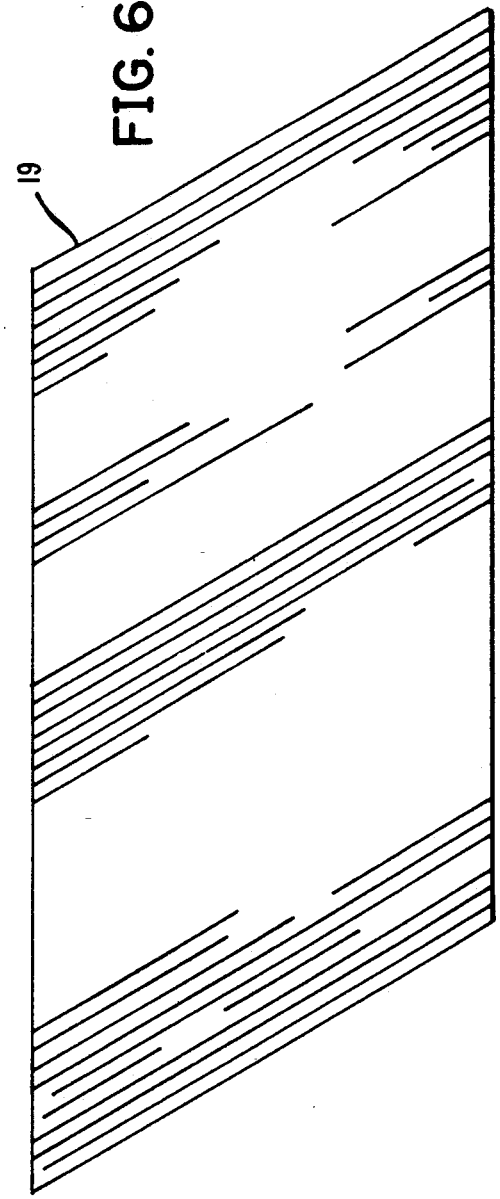

APPARATUS FOR THE DECANTATION TREATMENT OF LIQUID CONTAINING THEREIN SUSPENDED MATERIAL

BACKGROUND OF THE INVENTION

1(a) Field of the Invention

The present invention relates to an improved apparatus for the decantation treatment of liquid containing therein suspended material, particularly water.

1(b) Brief Description of the Prior Art

French patent no. 1 115 038 relates to an apparatus for the decantation treatment of waste water including a pulsated sludge bed.

French patent no. 2 132 954 (which correspond to Canadian patent no. 991.096 and U.S. Pat. No. 3,788,981) relates to improvements in the apparatus of French patent no. 1 115 038. These improvements lie essentially in the addition of a "finishing member" (i.e. a network of parallel plates or tubes inclined to the horizontal) positioned above the sludge bed (i.e. in a sedimentation zone). This finishing member contributes to stabilize the sludge, to improve the decantation, to "trap" sludge particles that may escape from the bed toward the sedimentation zone and return them to the bed, and make it possible to cope with variations in the quality of the liquid to be treated. This network may be retained above the sludge bed, by steel ropes, supporting platform or other equivalent and known means.

French patent no. 2 196 832 (which correspond to Canadian patent no. 1 024 082 and U.S. Pat. No. 4,156,644) also relates to improvements in the apparatus of French patent no. 1 115 038. These improvements lie essentially in the positioning of a network of parallel plates inclined to the horizontal within the sludge bed and provided with baffles. This network is intended to create concentrated currents of the liquid going upwardly and the sludge settling downwardly in order to increase the coagulation in the sludge bed, the concentration of the sludge bed, the ascentional velocities of the liquid to be treated and the overall efficiency of the apparatus.

Because a sludge bed results of an equilibrium between the amount of particles brought to the sludge bed under a determined flow rate of water, and the amount of sludge withdrawn (i.e. evacuated through an appropriate sludge separator) any sudden change of flow rate of waste water may negatively affect this equilibrium. The density of a fluidized sludge bed varies inversely as the flow rate percolating through it. A sudden decrease of the rise rate through the bed causes compaction and reduction of the volume of the bed. Inversely, a sudden increase of the rise rate causes a dilution of the sludge and expansion of its volume.

Each of aforesaid apparatus shows drawbacks when the upward flow rate of liquid to be treated is suddenly increased. With the apparatus of French patent no. 1,115,038, the upward flow rate is kept low in order to avoid the risk of destroying the sludge cohesion. With the apparatus of French patent no. 2,132,954, the upward flow rate of liquid to be treated may be about double the one used with the apparatus of French patent no. 1,115,038. In fact, slight lacks of cohesion that would normally occur under a higher flow rate of the liquid to be treated, are compensated by the positioning of finishing members above the sludge bed. (i.e. the cohesion of the sludge is stabilized). With the apparatus of French patent no. 2,196,832, when the upward flow rate (which already has a high velocity) suddenly changes to a higher velocity, there is an expansion of the sludge bed that may raise the interface between the agglomerating zone and the sedimentation zone above the network of inclined plates or tubes. When such event occurs the efficiency of the apparatus is negatively affected (e.g. the turbidity of the clarified water is increased).

SUMMARY OF THE INVENTION

An object of the present invention is to provide an improved apparatus which overcomes drawbacks existing with an apparatus of the type described in French patent no. 2196832. More particularly, an object of the invention is to provide an improved apparatus of the above mentioned type which is less affected by a sudden increase of its upward flow rate of liquid (e.g. water).

The apparatus for the decantation treatment of liquid containing therein suspended material to which an improvement according to the invention is made, corresponds to an apparatus of the type described in French patent no. 2,196,832. More particularly, it includes a tank having in the bottom thereof a pulsated sludge bed forming an agglomerating zone, a sedimentation zone directly above and in communication with said sludge bed for clarifying said liquid, inlet means for pulsatingly receiving said liquid from a pulsating supply source and for introducing said liquid into the bottom of said tank, header and branch pipe means for passing said liquid from said inlet means into the bottom of said sludge bed to thus pulsate said sludge bed, for passing said liquid upwardly through said sludge bed at a predetermined speed to agglomerate and remove a portion of said suspended material from said liquid, and for immediately thereafter continuing to pass said liquid upwardly from said sludge bed through said sedimentation zone, a first network of parallel plates inclined to the horizontal at an angle from 40 degrees to 70 degrees positioned within said sludge bed from a position above said header and branch pipe means to a position within the sedimentation zone, said plates being provided with baffle plates that are inclined to the horizontal at an angle of from 20 to 70 degrees, and forcing all of said upwardly passing liquid to pass upwardly through said sludge bed in paths causing said rising liquid and settling sludge to form currents in parallel but opposite inclined directions, the baffles causing a deflection and re-mixing of these currents, thereby increasing the tendency of said sludge to agglomerate; and clarified liquid and sludge outlets. The improvement to this apparatus is characterized by the fact that a second network of parallel plates inclined to the horizontal at an angle from 40 degrees to 80 degrees (especially 60 degrees) is positioned within the sedimentation zone, the distance between each adjoining plates of said second network being much smaller than the one between adjoining plates of the first network. The positioning of the second network in the sedimentation zone, above the coagulating zone, will contribute, of course, to improve the decantation when the apparatus is running with usual upward flow rates of liquid to be treated. However, when the apparatus is submitted to such an increase of the upward flow rate of liquid to be treated that the sludge bed is expanded and the interface between the agglomerating zone and the separation zone would be raised near or above the top of the first network, the second network also shows other unexpected advantages:

1. To limit the expansion of the sludge bed. Indeed, the Applicant has surprisingly noted that the positioning of a network of parallel plates (or tubes) inclined to the horizontal above a sludge bed, when this bed is expanded subsequently due to a sudden increase of the upward flow rate of water passing through said bed, the top of the bed will be raised till a certain height between the plates (or in the tubes) of the second network and stopped there. The height of the raise between the plates (or in the tubes) of the second network is function of the initial density of the sludge bed and of the upward flow rate of the liquid per surface unit of the bed. Within range of density of sludge bed and upward flow rate of liquid that are used with the apparatus of French patent no. 2 196 832, the second network defines an efficient brake to sludge bed expansion.

2. To confine the interface agglomerating zone (sludge bed)-sedimentation zone (clarified liquid) within the second network. As stated hereinbefore, the efficiency of the apparatus of French patent no. 2 196 832 is negatively affected when the aforesaid interface is raised above the first network. However, this lack of efficiency is avoided when a second network according to the invention is positioned above the first network thus when the sludge bed is expanded said interface always remains within an inclined laminar decantation network (i.e. the second network).

3. Also it will be possible to use the apparatus with higher continuous upward flow rates of liquid through the sludge bed.

According to a first preferred embodiment of the invention, the second network rests on a platform positioned above the first network, said platform consisting of a plurality of parallel beams whose opposite ends thereof are respectively fastened to opposite walls of the tank with appropriate fastening means, (e.g. an aluminium angle bar having orthogonal flat members, one of said flat members being fastened to the tank (advantageously with screws) while the orthogonal flat member is fastened to the beam (advantageously with screws) and a plurality of parallel cross-bars (e.g. aluminum angle bars) fastened to said beams with appropriate fastening means (e.g. galvanized nails or screws or bolts).

Avantageously, the second network is divided into a plurality of modules, each module consisting of a plurality of parallel corrugated sheets inclined to the horizontal at an angle from 40 to 80 degrees, (advantageously 60 degrees) said corrugated sheets being joined together so as to define a plurality of parallel tubes.

Preferably, each corrugated sheet is made with plastic or metal, each said sheet being so formed or moulded that when a plurality of sheets are joined together the resulting module shows a honeycomb structure. The joining of sheets may be achieved with any appropriate means such as spot welding, rivets, glue, etc.

More particularly, each module is made with plastic corrugated sheets (e.g. POLYSTYRENE) and shows a plurality of parallel tubes, defining a honeycomb structure each tube having a 2 inches hexagonal cross section and being inclined to the horizontal at 60 degrees, said module, being approximately two feet depth, six feet length and two feet wide.

Advantageously, beams are aluminum beams or preferably wood beams. Wood beams may be treated with an appropriate wood preservative. Cross-bars are preferably aluminium angle bars, fastened to the beams with galvanized nails or screws.

According to a second preferred embodiment of the invention, the second network consists of a plurality of set of n parallel plates, each set being positioned, at least in part, between a corresponding pair of parallel plates of the first network, all the plates being coplanar and equidistant, all the plates of the second network being hung on a plurality of supporting bars and held coplanar and equidistant from each other with appropriate spacing means, and said supporting bars being connected with the top edge of the plates of the first network with appropriate connecting means.

Advantageously, spacing means are divided into upper and lower spacing means;

said upper spacing means consisting of a plurality of first bores provided in an upper portion of each plate of the second network, and a plurality of parallel notches provided on a top surface of each supporting bar, each first bore of each plate of the second network being of sufficient size to be engaged by one corresponding supporting bar, and having its upper portion designed to fit with a corresponding notch of said supporting bar;

said lower spacing means, for each set of n plates of the second network (e.g. n may be 5), consist of a plurality of second bores provided in a lower portion of each plate of the second network, a plurality of tubular spacers having an inner diameter, a plurality of rods having opposite ends and a length shorter than the distance existing between two adjoining plates of the first network, each of said rod being engaged through an alternance of n plates of the second network an n+1 tubular spacers, having one end connected to a shoe that rests against a top surface of a corresponding plate of the first network and the opposite end is provided with tightening means intended to strengthen the coplanar arrangement of plates of the second network with respect to each other and with respect to the plates of the first network.

Advantageously, aforesaid fastening means consist, for each rod, of a threaded end portion of the rod on which is engaged a corresponding threaded nut.

BRIEF DESCRIPTION OF THE DRAWINGS

The invention will be better understood with reference to the following non-restrictive description of preferred embodiments thereof, taken in connection with the accompanying drawings in which:

FIG. 5 is a top plan view of a module;

FIG. 6 is a side elevational view of the module of FIG. 5;

FIG. 7 is a partial top plan view of the module of FIG. 5 illustrating the joining of corrugated sheets;

DETAILED DESCRIPTION OF THE INVENTION

Figure 1:
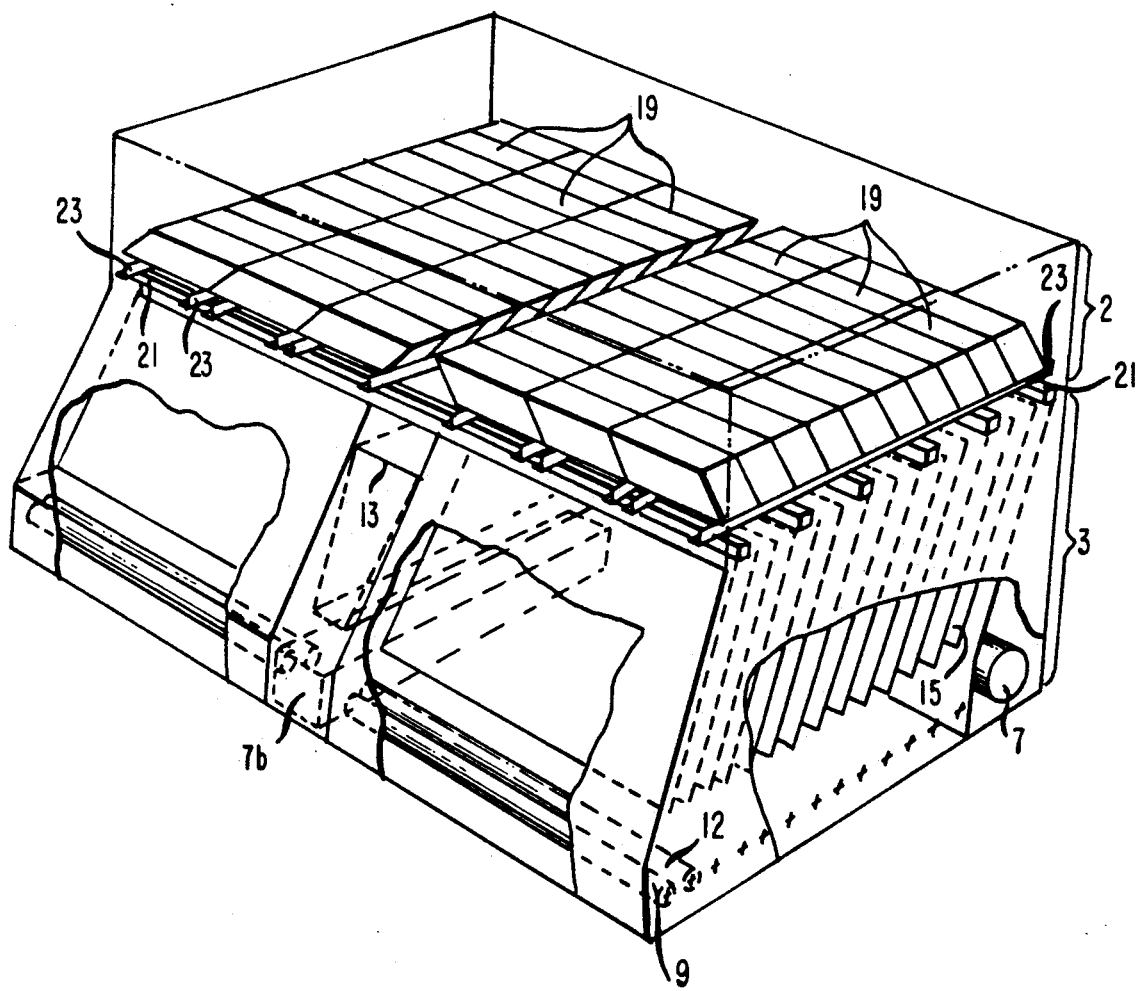
FIG. 1 is a perspective view of an apparatus according to the invention where the liquid outlets for the clarified liquid have not been represented in order to well illustrate the plurality of modules supported on a platform above a first network of inclined plates.

FIGS. 1 to 7 of the accompanying drawings represent an improved apparatus "A" according to a first preferred embodiment of the invention.

This apparatus "A" comprises a tank 1, a sedimentation zone 2, an agglomerating zone 3, separated an interface 4, inlet means for pulsatingly receiving a liquid to be clarified (especially water already mixed with an efficient amount of coagulating and flocculating agents) from a pulsating supply source (not shown and well known to skilled workman) and comprising header pipes 7, 7a and 7b, and branch pipes 9 (which are provided with a plurality of openings 11 and adjacent to baffles 12), a sludge separator 13, a network of parallel plates 15 (each plate being provided with baffles 17 and inclined specially at 40 to 70 degrees to the horizontal), a network "N" of parallel tubes which network "N" is defined by a plurality of modules 19 supported on a platform consisting of beams 21 and cross-bar 23, and clarified liquid outlets (which consist of a plurality of branch pipes 25 each provided with a plurality of openings 27, and connected to a main pipe 29).

Figure 4:
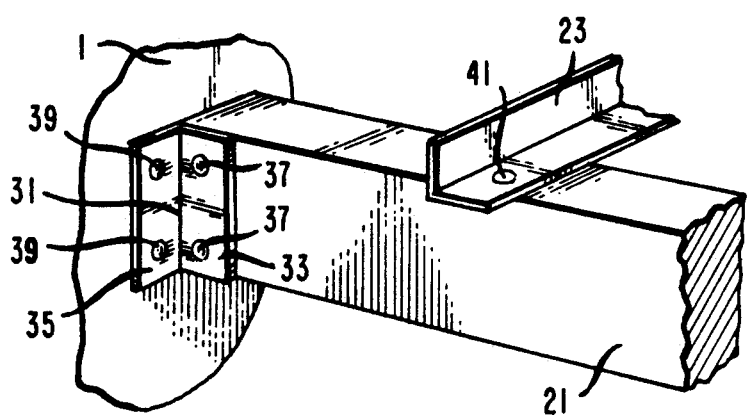
FIG. 4 is a partial perspective view representing how the platform is fastened to the inner wall of the tank.
Figure 9:
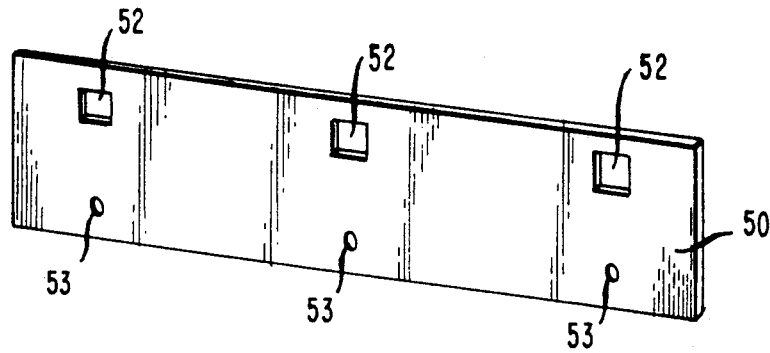
FIG. 9 is a perspective view of one plate of the second network of the apparatus of FIG. 8.
Figure 8:
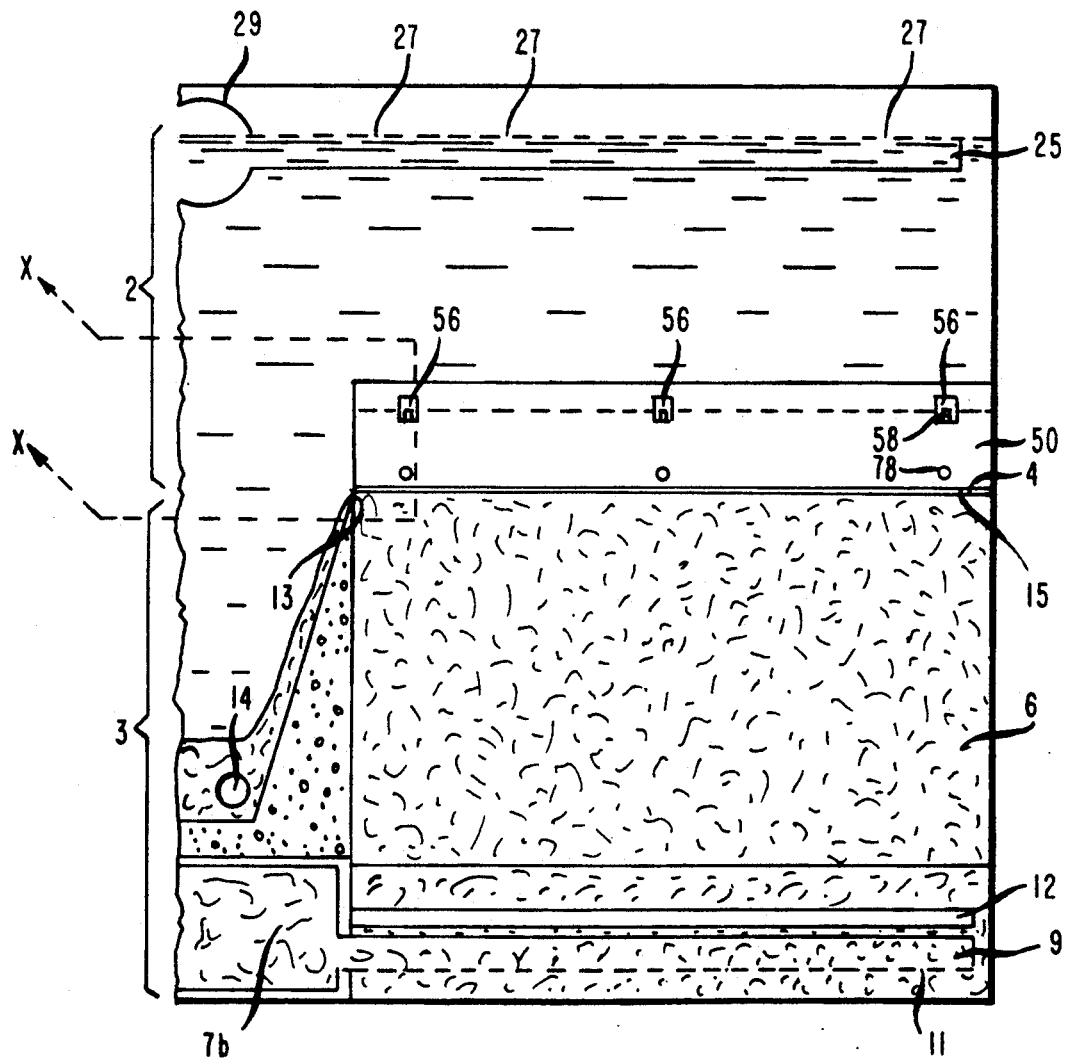
FIG. 8 is a partial front elevational view of a variant of the apparatus shown in FIG. 3.
Figure 10:
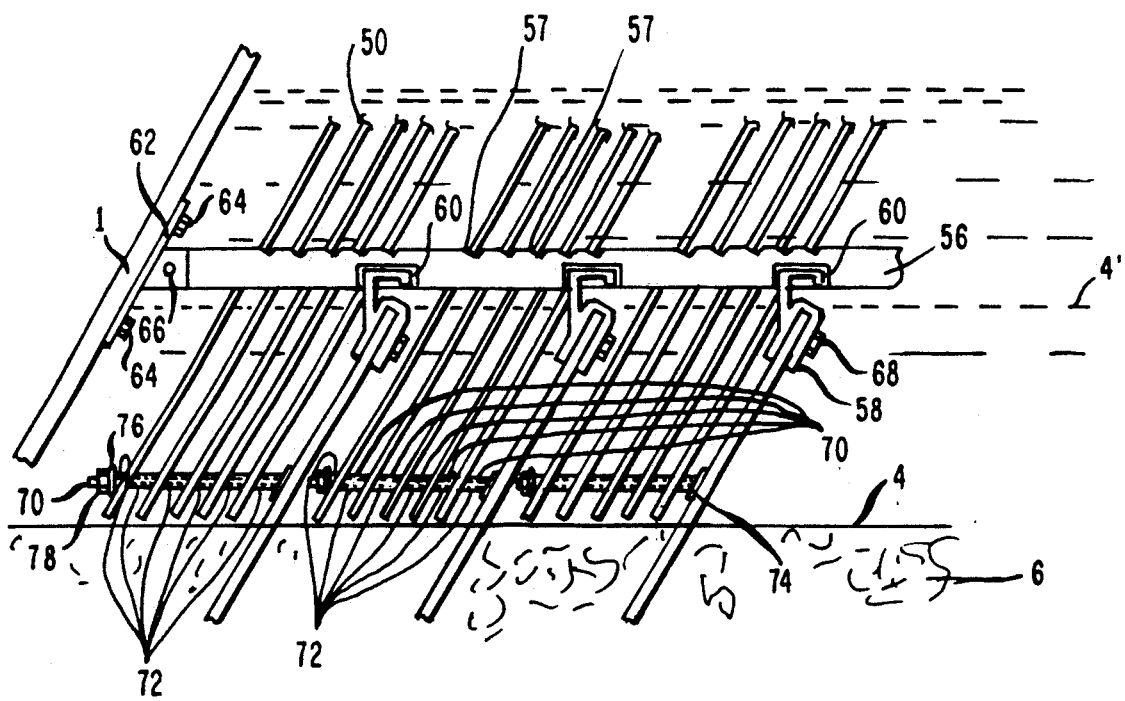
FIG. 10 is a partial side elevational view, according to X—X in FIG. 9 illustrating how supporting bars may be connected with the top of the first network and the tank.
Figure 11:
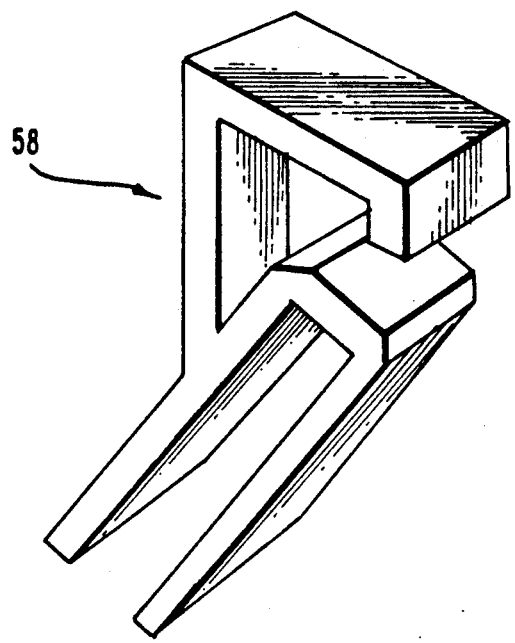
FIG. 11 is a perspective view of a connector usable to embody the apparatus of FIG. 8.

FIG. 4 shows details of the platform. Each end of each beam 21 (advantageously a piece of wood which may be treated with an appropriate wood preservative) is fastened to the inner wall of the tank 1 with an angle bar 31 having orthogonal flat members 33 and 35 provided with bores. Galvanized screws 37 (or bolts) are engaged through corresponding bores of flat member 33 and driven into the piece of wood defining the beam 21 in order to fasten the angle bar 31 to the beam 21. Galvanized screws 39 (or nails) are engaged through corresponding bores of flat member 35 and driven into the material defining the inner wall of the tank 1 in order to fasten the angle bar 31 to the tank. When the wall of the tank 1 is made of concrete, a plug may be provided in said wall for each screw 39. The cross bar 23 is an aluminum angle bar whose one flat member is provided with bores facing each beam 21. A galvanized screw 41 engages each bore and is driven into the beam 21 in order to fasten cross bars 23 to beams 21.

FIGS. 5 to 7 show details of a module 19. A plurality of corrugated sheets 43 are cut and joined together by any appropriate means to define a module consisting of a plurality of hexagonal tubes 45 inclined to the horizontal, such as gluing (especially when sheets 43 are made of plastic material such as POLYSTYRENE), riveting, spot welding (especially when sheets 43 are made of metallic material such as aluminum), etc. Preferably, each module is two feet depth, six feet length and two feet wide, and each tube has a cross section of about two inches. The thickness of sheets 43 may vary within wide range (depending on the kind of material used). This thickness is of course very easy to determine for one skilled in the art. Preferably, sheets 43 are as thin as possible, especially about 1 mm. In normal use (i.e. in absence of sudden increase of the upward flow rate of liquid to be treated), the apparatus "A" works as follows.

The liquid to be treated (especially water already mixed with an efficient amount of one or more coagulating and flocculating agent well known to skilled workman, (e.g. coagulating agent: alun or ferric chloride; flocculating agent: activated silica)), is received from a pulsating supply source and successively passed, at constant rate, through pipes 7, 7a, 7b and 9, and openings 11 to reach the bottom of the tank 1. Then the liquid is uniformly distributed through a sludge bed 6 by the baffles 12 and a determined upward flow rate through the bed is established. The liquid to be treated is passed between plates 15 (which are advantageously at about 300 mm from each other) and baffles 17 as it is described in French patent no. 2196832. More particularly, the liquid is passed generally upwardly through the sludge bed at a predetermined speed, while suspended material is agglomerated and removed from the liquid. After passage through the sludge bed, the liquid continues to pass upwardly through a sedimentation zone where a network of modules 19 is positioned. These modules work, in normal use, as it is described in French patent no. 2132954, further clarify the liquid. Then the clarified water is collected by pipes 25 (through openings 27) and discharged through pipe 29. The sludge bed is maintained at a certain level between plates 15. Excess of sludge spills into a separator 13 comprising a sludge extractor 14. Also, according to the invention, modules 19 allow to use higher upward flow rate of liquid through sludge bed 6.

According to the invention, when a sudden increase of the upward flow rate of liquid to be treated occurs, the corresponding expansion of the sludge bed 6 suddenly shifts the interface 4 (between the sedimentation zone 2 and the agglomerating zone 3) to a position 4' above the plates 15 and partly engaged in the tubes 45 of the modules 19 where it is stopped. When the upward flow rate of liquid return to its normal velocity the interface 4 returns between plates 15.

During the expansion of the sludge bed, the raise of the interface has been stopped and kept within the network "N" of inclined tubes. The turbidity of the clarified liquid always remains within acceptable range.

FIGS. 8 to 11 of the accompanying drawings represent another preferred embodiment of the invention and define a variant to the apparatus "A" illustrated in FIGS. 1 to 7. According to this variant, the second network "N" and its corresponding platform (i.e. beams 21 and cross bars 23) are replaced by a network "NN" consisting of sets of plates 50, supporting bars 56 and spacing means.

Between the upper portion of each pair of neighboring plates 15 (here front wall and rear wall of the tank 1 are considered as plates 15), a set of five equidistant and coplanar plates 50 is partially and coplanarily positioned. Each plate 50 may be made of metal (e.g. aluminum) and is provided with three bores 52 and three bores 53. Each plate 50 is about 2 feet height and has a width at least equal to the width of plate 15. The thickness of a plate 50 is very easy to determine for a skilled workman and may vary within wide range. It is preferably as thin as possible. (e.g. 1 mm). Each supporting bar 56 is engaged through a corresponding bore 52 of each plate 50, has opposite ends, a top surface provided with a plurality of set of five equidistant notches 57, a bottom surface provided with a plurality of parallelepipedic housing 60 whose geometry is designed to be engaged by the upper portion of a connector 58. The lower portion of the connector 58 is designed to engage the top edge of a plate 15. The end of each supporting bar 56 that faces the front wall of the tank 1 is fastened to said front wall by any appropriate means in order to counterbalance the vectorial force generated by the weight of plates and supporting bars and avoid deformation of plates 15. Advantageously, one end of each supporting bar 56 is provided with a bore that can be aligned with a corresponding bore of a connector 62 bolted to the front wall of the tank 1 with bolts 64, so that a pin 66 be engaged through aligned bores. Advantageously, the lower portion of the connector 58 is provided with a threaded bore in which is screwed a corresponding threaded bolt 68 in order to lock the connector 58 on the plate 15 upon tightening of the bolt 68. If desired, the upper portion of the connector 58 may be fastened inside a corresponding housing 60 by any appropriate means such as bolting, riveting, etc.

Spacing means are, for each set of five plates 50 positioned between two corresponding plates 15 (eventually a plate 15 and a front or rear wall of the tank 1) consist of upper and lower spacing means.

As upper spacing means, the upper portion of each bore 52 is associated with a corresponding notch 57.

As lower spacing means, a rod 70 having opposite ends passes through five bores 53 and six tubular sleeve 72, one end of said rod being fastened by any appropriate means (e.g. welding, bolting, etc) to a shoe 74 that rest against a corresponding plate 15 (or eventually the rear wall of the tank 1) while opposite end thereof is threaded, engaged by a flat washer 76 and engaged by a corresponding threaded nut 78. The distance between notches 57 and the length of sleeves 72 (which defines tubular spacers) are such that plates 50, upon tightening of nut 78, are equidistant and coplanar to each other, and coplanar and equidistant with respect of plates 15 (or plate 15 and front or rear wall of the tank 1). Preferably, there is about 300 mm between neighboring plates 15 and about 50 mm between neighboring plates 50.

Here again, according to the invention, when a sudden increase of the upward flow rate of liquid to be treated occurs, the sludge bed is suddenly expanded and interface 4 (between the sedimentation zone 2 and the agglomerating zone 3) is shifted upwardly. When the interface 4 engages the second network "NN", it is stopped between the plates 50 in position 4'. When the upward flow rate of liquid returns to its normal velocity the interface 4 return to its lower position between the plates 15. During the expansion of the sludge bed 6, the turbidity of the clarified liquid remain within acceptable ranges.

EXAMPLE

Two apparatus built in accordance with the specification of the invention described in French patent no. 2196832 were normally used with equal upward flow rate of liquid (water) to be treated. In fact the flow is equally distributed between both apparatuses at 3 m/hour on the sludge bed area. A coagulating agent (alun) and a flocculating agent (activated silica) were mixed with water to be clarified, before being introduced into saids apparatuses. The flocculating agent (activated silica) was fed at a dosage of 1.2 mg/l and the clarified water showed an average turbidity of 0.8 NTU (NEPHELOMETRIC TURBIDITY UNITS).

One of aforesaid apparatuses was modified in order to be identical to the one shown in FIGS. 1 to 7 (i.e. a network of modules 19 was positioned on a platform above the plates 15). Then sudden variation of the upward flow rate of water to be clarified were carried out.

i) The upward flow rate of water entering in the apparatus "F" according to French patent no. 2196832 was increased instantly from 3 m/h to 4.5 m/h. (This meant that the upward flow rate in apparatus A was reduced to 1.5 m/h). Within 12 minutes, the top of the sludge bed was raised above the plates 15 and, within 40 minutes, the top of the sludge bed was near the bottom of branch pipes 25. There were floc particles in all the sedimentation zone 2 above the sludge bed. The test was stopped. The turbidity of the clarified water had increased from 0,72 NTU to 2,94 NTU.

ii) The upward flow rate of water entering in the apparatus "A" according to the present invention was increased from 1.5 m/h to 4.5 m/h for 20 minutes and then increased to 6 m/h for one hour. (This meant that the upward flow rate in apparatus "F" was reduced to 1.5 m/h and then to 0 m/h). The expansion of the sludge bed was stopped efficiently by tubes 45 of the modules 19. The turbidity of the clarified water was slightly increased from 0,72 NTU (after 30 minutes) to 0.82 NTU (after 75 minutes). However, it should be noted that a slight adjustment of the amount of flocculating agent may have overcome this slight increase of turbidity.

iii) Finally, the upward flow rate of water to be treated was set to 2.4 m/h in apparatus "F" and 3.6 m/h in apparatus "A". The clarified water obtained with apparatus "F" was about 0.8 NTU (with an amount of activated silica reduced to 0,7 mg/l) while the clarified water obtained with the apparatus "A" (with an upward flow rate that is higher) showed a fluidity that was on the average from 0,05 to 0,1 NTU lower.

The clarified water obtained with apparatus F and A was drinking quality water. According to specification of French patent no. 2,196,832, baffles 17 of apparatuses A and F comprise small plates having a length which may be as great as 2L/3 wherein L designates the relative spacing between plates 15. The baffle form with the horizontal an angle of a value within the range of 20 degrees to 70 degrees.

These baffles 17 may consist of any suitable material (plastic, metal, etc.) and more particularly of the same material as that constituting plates 15.

Figure 2:
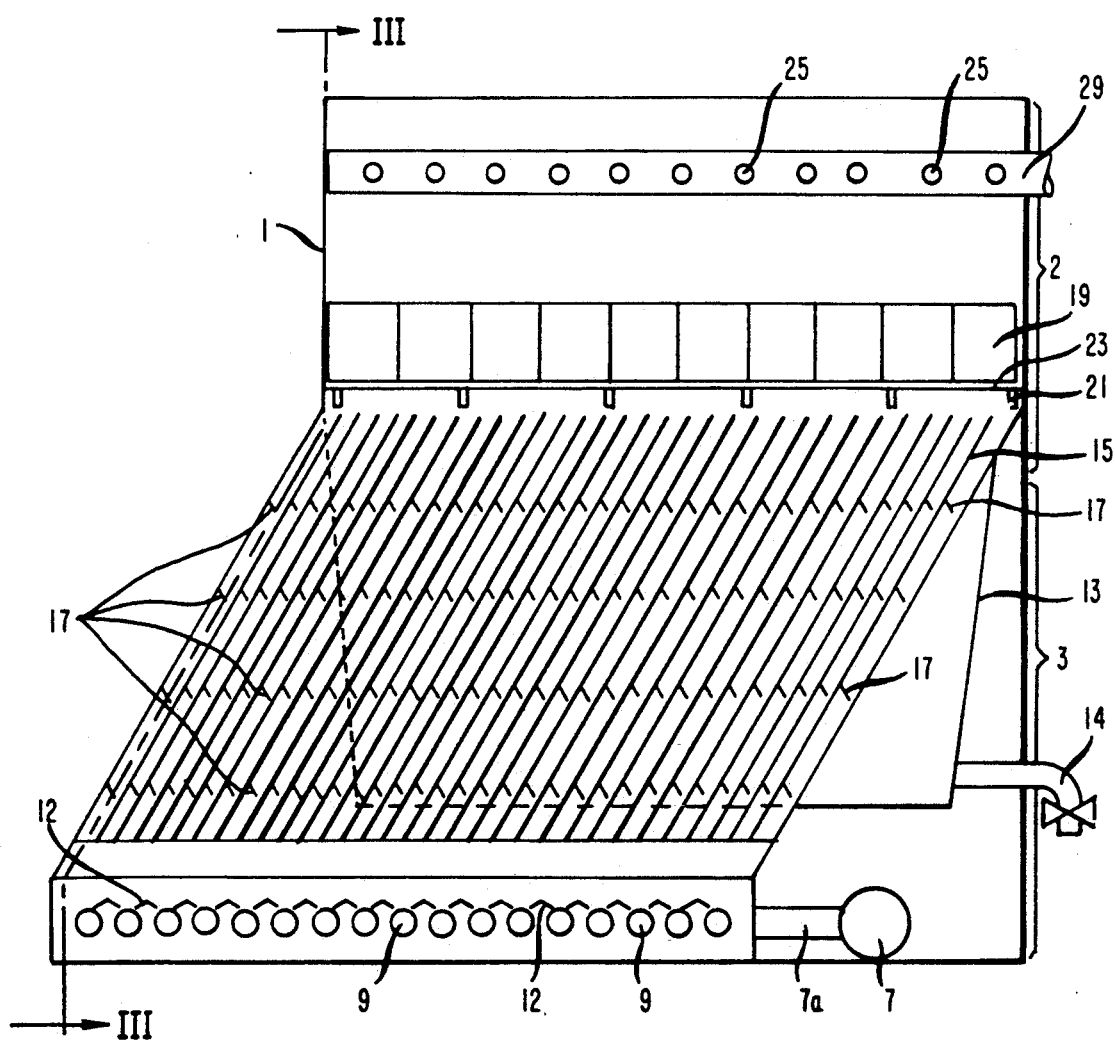
FIG. 2 is a side elevational view of the apparatus of FIG. 1 (represented here with its liquid outlets)
Figure 3:
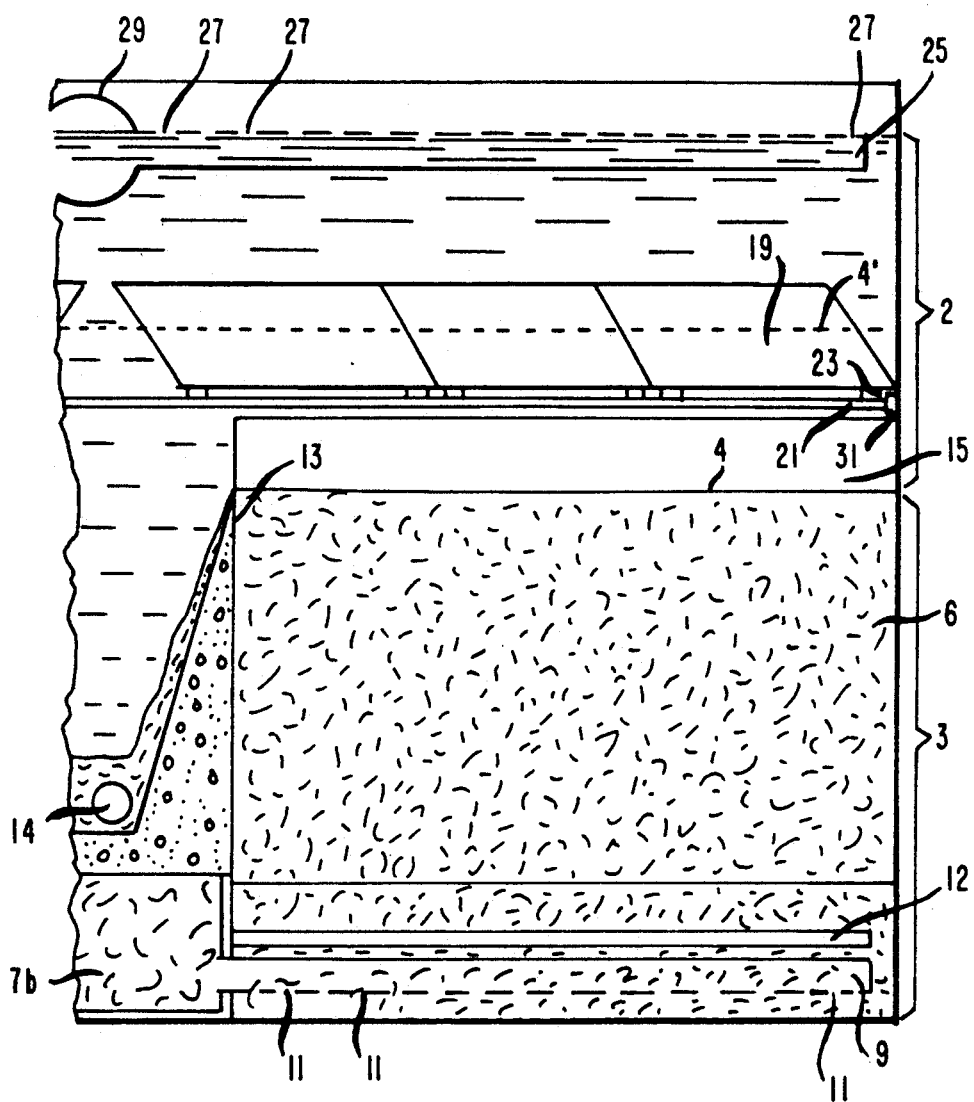
FIG. 3 is a partial front elevational view, according to line III—III of the apparatus of FIG. 2 (represented here with its liquid outlets and filled with sludge bed and clarified water)

On a given plate 15 are provided a suitable number of baffle plates 17 as illustrated in FIG. 2. The distance H between two successive baffle plates 17 is preferably of about 1 to 5 times the distance L (i.e. $L < H < 5L$).

The embodiments of the invention in which an exclusive property or privilege is claimed are defined as follows:

1. In an apparatus for the decantation treatment of liquid containing therein suspended material, said apparatus including a tank having in the bottom thereof a pulsated sludge bed forming an agglomerating zone, a sedimentation zone directly above and in communication with said sludge bed for clarifying said liquid, inlet means for pulsatingly receiving said liquid from a pulsating supply source and for introducing said liquid into the bottom of said tank, header and branch pipe means for passing said liquid from said inlet means into the bottom of said sludge bed to thus pulsate said sludge bed, for passing said liquid upwardly through said sludge bed at a predetermined speed to agglomerate and remove a portion of said suspended material from said liquid, and for immediately thereafter continuing to pass said liquid upwardly from said sludge bed through said sedimentation zone; a first network of parallel plates inclined to the horizontal at an angle from 40 degrees to 70 degrees positioned within said sludge bed agglomerating zone from a position above said header and branch pipe means to a position within the sedimentation zone, said plates being provided with baffle plates that are inclined to the horizontal at an angle of from 20 to 70 degrees and wherein said parallel plates form means for forcing all of said upwardly passing liquid to pass upwardly through said sludge bed in paths causing said rising liquid and settling sludge to form currents in parallel but opposite inclined directions, the baffle plates forming means for causing a deflection and remixing of said currents, thereby increasing the tendency of said sludge to agglomerate; and clarified liquid and sludge outlets; the improvement wherein a second network of parallel plates or tubes inclined to the horizontal at an angle from 40 degrees to 80 degrees is positioned within the sedimentation zone, the distance between adjoining plates of said second network being smaller than the distance between adjoining plates of the first network.

2. An apparatus according to claim 1, wherein the second network rests on a platform positioned above the first network, said platform consisting of a plurality of parallel beams whose opposite ends thereof are respectively fastened to opposite walls of the tank with appropriate fastening means, and a plurality of parallel cross-bars fastened to said beams with appropriate fastening means.

3. An apparatus according to claim 2, wherein the second network is divided into a plurality of modules, each module consisting of a plurality of parallel corrugated sheets inclined to the horizontal at an angle from 40 to 80 degrees, said corrugated sheets being joined together so as to define a plurality of parallel settling tubes.

4. An apparatus according to claim 3, wherein each corrugated sheet is made with plastic or metal, each said sheet being so formed or moulded that when a plurality of sheets are joined together the resulting module shows a honeycomb structure.

5. An apparatus according to claim 4, wherein the module is made with plastic corrugated sheets and shows a plurality of parallel tubes, defining a honeycomb structure each tube having a 2 inches hexagonal cross section and being inclined to the horizontal at 60 degrees, said module, being approximately two feet depth, six feet length and two feet wide.

6. An apparatus according to claim 5, wherein beams are wood beams treated with an appropriate wood preservative, wherein cross-bars are aluminium angle bar, wherein angle-bars are fastened to the beams with galvanized nails or screws, and wherein beams are fastened to the tank with a angle bar whose one flat member is anchored to the tank with appropriate fasteners while the orthogonal member is connected to the beam with appropriate fasteners.

7. An apparatus according to claim 1, wherein the second network consists of a plurality of sets of parallel plates, each set being positioned, at least in part, between a corresponding pair of parallel plates of the first network, all the plates being coplanar and equidistant, all the plates of the second network being hung on a plurality of supporting bars and held coplanar and equidistant from each other with appropriate spacing means, and said supporting bars being connected with the top edge of the plates of the first network with appropriate connecting means.

8. An apparatus according to claim 7, wherein spacing means are divided into upper and lower spacing means;

said upper spacing means consisting of a plurality of first bores provided in an upper portion of each plate of the second network, and a plurality of parallel notches provided on a top surface of each supporting bar, each first bore of each plate of the second network being of sufficient size to be engaged by one corresponding supporting bar, and having its upper portion designed to fit with a corresponding notch of said supporting bar;

said lower spacing means, for each set of n plates of the second network, consist of a plurality of second bores provided in a lower portion of each plate of the second network, a plurality of tubular spacers having an inner diameter, a plurality of rods having opposite ends and a length shorter than the distance existing between two neighboring plates of the first network, each of said rod being engaged through and alternance of n plates of the second network and n+1 tubular spacers, having one end connected to a shoe that rests against a top surface of a corresponding plate of the first network and the opposite end is provided with tightening means intended to straighten the coplanar arrangement of plates of the second network with respect to each other and with respect to the plates of the first network.

9. An apparatus according to claim 8, wherein said fastening means consist, for each rod, of a threaded portion of the rod on which is engaged a corresponding threaded nut.

10. An apparatus according to claim 9, wherein n is 5.

* * * * *